United States Patent Office 2,934,267
Patented Apr. 26, 1960

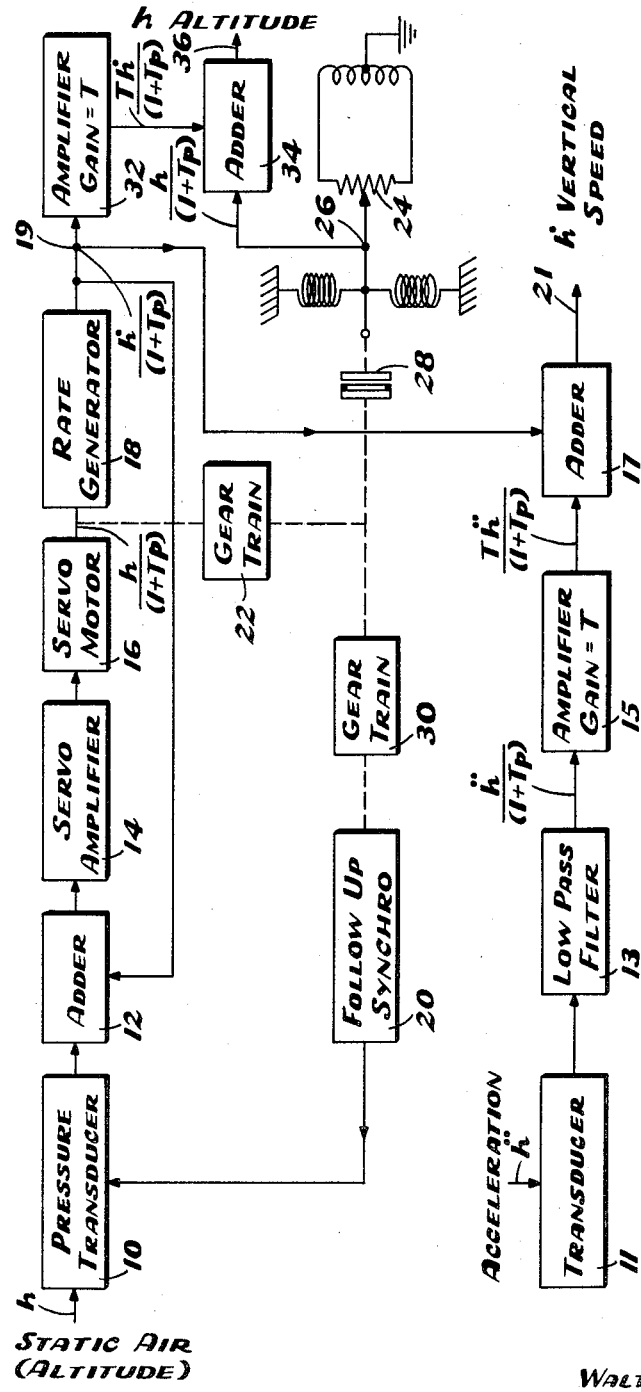

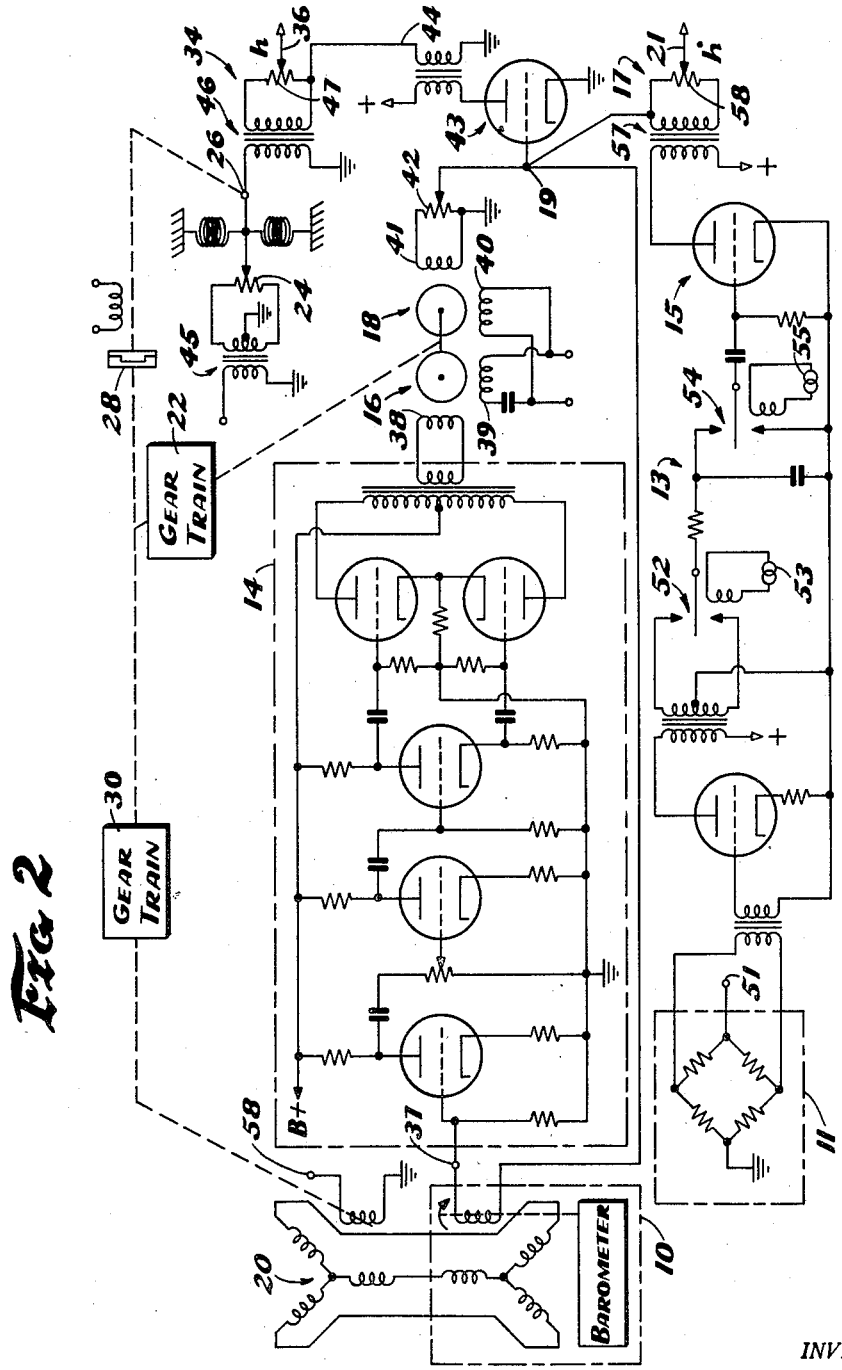

2,934,267

VERTICAL SPEED COMPUTER AND ALTITUDE CONTROL

Walter H. Wirkler, Garnavillo, and William G. Anderson and Theodore R. Willis, Cedar Rapids, Iowa, assignors to Collins Radio Company, Cedar Rapids, Iowa, a corporation of Iowa Application January 13, 1956, Serial No. 558,957

3 Claims. (Cl. 235—151)

This invention relates to automatic aircraft control systems and more particularly to a generator of vertical position and speed signals.

Prior art devices of this nature used merely voltage signal generators driven by aneroid barometer systems or some other simple device deriving a voltage corresponding to the variable of altitude or vertical speed. For pilot control from instruments in slowly moving aircraft, an indicator showing merely altitude was originally sufficient. In present day flight, however, pilots also use rate of climb information in controlling their aircraft for maintaining an altitude position. Some prior art devices attempt to duplicate this type of control by taking the rate of change of altitude from the some source and using the sum of the two for altitude control such as in an auto pilot.

One of the several objections to this type of derivation is that the derivative is no better than the original source, and that both signals are subject to the frailties of aneroid barometer sources.

Another difficulty is that prior devices do not provide the best signal available for control of vertical position in an aircraft.

One object of this invention is to provide vertical position and speed signals utilizable in automatic pilot systems.

Another object of this device is to provide vertical speed and acceleration signals which contain frequency components derived from the best sources available, modified and combined to yield an information signal which is a more accurate representation of the aircraft's vertical speed.

One feature of this invention is the utilization of the aneroid barometer altitude rate signal combined with a filtered acceleration signal to provide a more reliable vertical speed signal.

Another feature of this invention is the use of a servo system to provide a large time-constant amplifier and to provide several types of signals related to the input thereof. This amplifier is driven by a signal related to atmospheric pressure, by virtue of an aneroid element which positions a synchro incorporated in the servo loop. Said amplifier operates a clutch coupled potentiometer by means of a servo motor; the potentiometer yields a voltage which corresponds to altitude. This potentiometer is also spring centered so that release of the clutch allows the potentiometer to center. This permits level flight along a reference path level after the clutch is energized. A rate generator is attached to the servo motor of the servo system to generate a voltage corresponding to the derivative of altitude.

Another feature of this system is the combination of a filtered acceleration signal derived from an accelerometer and the filtered rate of change of altitude signal derived from a rate generator in the altitude signal channel. The sum of these two signals is an accurate vertical speed signal which can be utilized to control the altitude of the aircraft more closely.

Another feature of this system is the use of the same time-constant in both the altitude and acceleration channels. This similarity of time-constant makes it possible to filter undesirable noise from each of the sources and yet permits a resultant combined voltage which is independent of the filter characteristic.

Another feature of this system is that the output signals generated by the system are based on the best frequency spectrum components available from each source.

Further objects, features, and advantages of the invention will become apparent from the following description and claims when read in conjunction with the drawings, in which:

Figure 1 shows a block diagram of the invention; and
Figure 2 shows a typical circuit diagram embodying the invention.

The system shown in Figure 1 has two channels; an altitude channel, and an acceleration channel.

In the altitude channel a transducer 10, sensitive to altitude is the starting point. This transducer can be in the form of an aneroid barometer or bellows connected by proper linkage to rotate the rotor of a synchro which is within the loop of the servo system constituting most of the altitude channel. Other types of altimeters may be used if provided with an output of shaft rotation which may be coupled to the synchro rotor as above.

Following the pressure transducer in the altitude channel is an adder 12 which adds a portion of the rate signal and the error signal derived from the synchro attached to said transducer. The sum of the two signals is amplified by servo amplifier 14 and applied to the servo drive motor 16. The rate feedback is made as high as possible, short of oscillation of the rate signal. As a consequence the dynamic characteristics of the servo amplifier and motor may be assumed equal to that of an integrator.

Servo motor 16 drives rate generator 18 and gear train 22 directly. Rate generator 18 yields a signal directly related to the rate of change of altitude, said signal being known in the art as a rate signal. Following gear train 22 is a second gear train 30 which drives a follow-up synchro 20. Three-wire position information generated by synchro 20 is connected electrically to the corresponding terminals of the synchro found in pressure transducer 10 to close the servo loop.

The position feedback ratio coming through follow-up synchro 20 is adjusted to give the servo loop an over-all transfer response of a low pass filter, $$\frac{1}{(1+Tp)}$$

where T is a time-constant in seconds and $p$ is a La Placian operator. T is made large enough to filter out noise due to stiction and high frequency pressure fluctuations. The low pass filter transmits only the relatively lower frequencies. This filtering leaves an altitude signal at the output of the servo motor which lacks high frequency components. Rate generator 18 restores these high frequency components when the two signals are combined in adder 34 to yield a true altitude signal as shown below in Equation 1. The legends on the drawing indicate the state of the signal at the various points.

Also coupled to gear train 22 is a clutch 28. Clutch 28 couples potentiometer arm 26 to the servo motor 16. The servo loop, which includes the amplifier previously described, consists of the pressure transducer 10, adder 12, servo amplifier 14, servo motor 16, gear trains 22 and 30, and follow-up synchro 20. This system has a long time-constant as a result of the reduction of input signal by the rate signal feedback, and has an output of $$\frac{h}{(1+Tp)}$$

as indicated by the position of the potentiometer arm 26, where $h$ represents the variable, altitude. The output of the rate generator 18 is thus $$\frac{\dot{h}}{(1+Tp)}$$

When changing altitude and no altitude error signal is needed, the electromagnetic clutch 28 is disengaged so that the voltage at the potentiometer returns to and remains at zero. When the desired altitude is reached, the clutch is engaged and the potentiometer voltage will then be proportional to the altitude error, or change of altitude position from a reference level.

The electrical signal at point 26, proportional to altitude, is applied to adder 34. The output of rate generator 18 at point 19 is coupled to an amplifier 32 of such gain that the signal has had a characteristic gain of T, taking into account other points of amplitude loss. The output of amplifier 32 is applied to adder 34 also. The sum of these two voltages applied to adder 34 yields a true altitude signal, $h$:

$$\frac{h}{(1+Tp)}+\frac{T(\dot{h})}{(1+Tp)}=\frac{h(1)}{(1+Tp)}+\frac{h(Tp)}{(1+Tp)}=h \quad (1)$$

The use of the rate signal in the servo system eliminates the lag of the servo system as it follows the altitude signal.

The altitude channel yields an altitude signal which is as good as the original source. The channel further derives altitude rate of change at point 19 which is used in deriving vertical speed. The vertical speed, $\dot{h}$, as derived in this system, is better than any previously derived in prior art systems, and better than can be derived from any one source.

The vertical speed signal derived as shown below is a more accurate representation by virtue of addition of spectra of frequency components derived from the available sensing sources, which spectra are the best bands of frequencies from each particular source, taking into consideration typical source noise, etc.

The acceleration channel starts with a sensing device shown as transducer 11. This may be any type of accelerometer which yields a voltage having an amplitude corresponding to acceleration. This voltage output is applied through a low pass filter 13 to amplifier 15. The transfer characteristic of low pass filter 13 is $$\frac{1}{(1+Tp)}$$

The signal is then applied to an adder after amplification by amplifier 15. The gain of amplifier 15 is such that it gives the signal an overall characteristic gain of T. The output of amplifier 15, $$\frac{T\ddot{h}}{(1+Tp)}$$

is added in adder 17 to the filtered rate signal, $$\frac{\dot{h}}{(1+Tp)}$$

taken from point 19 of the altitude channel.

It is easy to demonstrate that the output 21 of adder 17 is a true vertical speed signal, $\dot{h}$. The sum of the two signals fed into the adder is:

$$\frac{\dot{h}}{(1+Tp)}+\frac{T(\ddot{h})}{(1+Tp)}=\frac{\dot{h}(1)}{(1+Tp)}+\frac{\dot{h}(Tp)}{(1+Tp)}=\dot{h} \quad (2)$$

Thus, the output 21 of adder 17 is a true vertical speed signal which has its high frequency components derived by the acceleration channel and its low frequency components derived by the altitude generator. As stated before, the combination of these two frequency spectrum components gives a superior vertical speed signal in that the more reliable frequency components available from each of these two sources are combined to provide a more accurate vertical speed signal, with noise and other undesirable signals filtered out.

Inspection of Equation 2 shows the desirability of having the same filter time-constants and over-all gain characteristics in the two channels.

Figure 2 shows a typical circuit diagram embodying the invention. Units corresponding to the blocks in Figure 1 are numbered similarly. Pressure transducer 10 is shown in Figure 2 as a barometer-driven synchro. That is to say, the output of the barometer is coupled to rotate the rotor of a synchro. The stator of said synchro is excited by three-wire voltage derived by follow-up synchro 20. The output voltage 37 of the pressure transducer is thus an error voltage generated in the winding of the rotor as a consequence of the barometer moving the rotor from the position of the electrical null determined by the voltage on the stator.

Error voltage 37 is applied to the input of a servo amplifier 14 in series with a selected portion of the rate voltage generated by a rate generator 18. Servo amplifier 14 is shown here as an electron-tube amplifier but any amplifier (e.g. magnetic, transistor, etc.) which has the required voltage sensitivity, low noise level, and output power capability may be substituted. The output of amplifier 14 is applied to control winding 38 of servo motor 16. The other winding 39 of servo motor 16 is excited through a condenser from a reference alternating voltage source of the same frequency as the output frequency of amplifier 14.

Servo motor 16 is coupled mechanically to gear train 22 and to rate generator 18. Gear train 22 drives clutch 28 and gear train 30. Gear train 30 turns the rotor of the follow-up synchro 20. The rotor of follow-up synchro 20 is excited by an alternating reference voltage 58. The alternating voltage induced in the stator of follow-up synchro 20 is applied to the stator of the synchro in the pressure transducer. This closes the loop of the follow-up system which transforms barometric pressure to a position at clutch 28 and to a rate voltage at the output of rate generator 18.

Rate generator 18 has two windings, one of which, 40, is excited from the same source as winding 39 of servo motor 16. The second winding 41 is used as an output winding. The potentiometer 42 adjusts the amplitude of the rate signal applied to other portions of the circuit. As mentioned before, the rate signal is applied to the input of amplifier 14 to stabilize the operation of the servo loop, and to provide the slow response such that the servo loop has the dynamic characteristics of a first order low pass filter expressed by the transfer ratio $$\frac{1}{(1+Tp)}$$

The rate voltage derived is also applied to amplifier 43. Output terminal 44 of amplifier 43, therefore, has a voltage proportional to the filtered rate of change of altitude.

Potentiometer 24 is driven through clutch 28. The arm 26 of potentiometer 24 is spring centered so that when clutch 28 is disengaged the potentiometer is centered at a zero reference position. Potentiometer 24 is excited by transformer 45 from an alternating reference voltage source. As shown here, potentiometer 24 is a part of a bridge arrangement whereby the movable tap 26 yields a voltage varying in phase and amplitude according to the rise or fall in altitude from said reference altitude position, but any output circuit may be used to translate the rotary motion at clutch 28 to a voltage varying as a function of the rotation. Transformer 46 is coupled to tap 26. The secondary of transformer 46 is isolated from ground to permit connection of one side thereof to point 44. Potentiometer 47 is connected across the secondary of transformer 46 to permit adjustment of amplitude of the altitude signal. The amplified rate voltage at point 44 and the selected amount of altitude voltage are thus added and constitute the final altitude output, $h$, available at 36.

The accelerometer channel begins with the acceleration transducer 11. As illustrated here, a strain gauge bridge, of which one gauge at least is on the support beam of a cantilever-supported mass, not shown, constitutes the accelerometer. The strain gauge bridge is excited by an alternating reference voltage applied to point 51. The output voltage of transducer 11 is amplified and applied to a filter 13 through a synchronous rectifier 52. Filter 13 is a low pass type having a transfer characteristic of $$\frac{1}{(1+Tp)}$$

This filter is adjusted to give the same transfer characteristics as that of the altitude channel. Synchronous rectifier 52 is excited by voltage 53 which is related in frequency and phase to voltage 51. As a result of synchronous rectification a direct voltage which amplitude is a function of the acceleration is fed to the filter 13. Of course, accelerometers such as piezoelectric or magnetic types may be used directly, without rectification, as long as there is a direct voltage or current output proportional to acceleration which may be applied to said filter.

A modulator 54 is excited by the alternating reference voltage 55. This voltage should be of the same frequency and phase as the voltage applied to transformer 45, for instance. The modulated voltage output of filter 13 is then amplified by amplifier 15 and applied to transformer 57. The gain of amplifier 15 is adjusted to give the acceleration signal the proper gain characteristic from input to output, of T. The secondary of transformer 57 is shunted by potentiometer 58. By this arrangement the sum of the rate voltage at point 19 and a selected portion of the acceleration voltage as modified by the accelerometer channel may be added to yield an output which is proportional to vertical speed.

It is to be noted that accelerometer 11 may be any of several forms as will be obvious from an inspection of Figure 1; the form shown in Figure 2 is excited by, and has an output of, alternating current, and so must have a rectifier device preceding the low pass filter 13 of Figure 1 in order to apply a direct voltage to said filter. Alternating current is preferable here, to avoid problems arising from use of high gain direct current amplifiers.

Although this invention has been described with respect to particular embodiments thereof, it is not to be so limited because changes and modifications may be made therein which are within the full intended scope of the invention as defined by the appended claims.

We claim:

1. Altitude signal deriving means comprising an aneroid barometer, a first synchro, said barometer moving the rotor of said first synchro, a first amplifier having its input coupled to said rotor, a servo motor driven by said first amplifier, a rate generator mechanically coupled to said servo motor, the output of said rate generator being fed back in series with said rotor to the input of said first amplifier, a potentiometer having a movable tap, mechanical means coupling said potentiometer tap to said motor, a second amplifier excited by said rate generator, and combining means adding the output of said second amplifier and a voltage determined by the position of said potentiometer tap.

2. The altitude signal deriving means of claim 1 wherein said servo motor positions a second synchro and the three-terminal stator output of said second synchro is connected to the three-terminal stator of said first synchro.

3. An altitude and rate of change of altitude signal source for automatic control of aircraft comprising an aneroid barometer, a first synchro having a first rotor and a first three-terminal stator, said barometer coupled to move said first rotor, first amplifier means, motor means connected to said first amplifier, rate generator means mechanically coupled to said motor means, a selected portion of said rate generator and the voltage generated in said first rotor being connected in series to the input of said amplifier, a second synchro having a second rotor and a second three-terminal stator, said second rotor being positioned by said motor means, said second three-terminal stator being connected to said first three-terminal stator, potentiometer means actuated by said motor means to yield a voltage corresponding to a filtered altitude signal, second amplifier means connected to said rate generator, first combining means connected to the output of said second amplifier means and to said filtered altitude signal to yield a true altitude signal, acceleration transducer means yielding a carrier modulated in amplitude by acceleration, rectifier means connected to said acceleration transducer, low pass filter means having the same time constant as said first amplifier means, said filter means connected to said rectifier, modulator means connected to said low pass filter yielding a modulated carrier, third amplifier means, a second combining means connected to said rate generator and to said third amplifier means whereby a true vertical speed signal is yielded.

References Cited in the file of this patent

UNITED STATES PATENTS

| 1,997,412 | Fischel | Apr. 9, 1935 |
| 2,594,326 | MacCallum | Apr. 29, 1952 |
| 2,663,832 | McDonald et al. | Dec. 22, 1953 |
| 2,775,122 | Smith et al. | Dec. 25, 1956 |
| 2,775,124 | Gardner et al. | Dec. 25, 1956 |

OTHER REFERENCES

Proc. of IRE (Ragazzini et al.), March 1947, page 447.

Servo Mechanism Practice (Ahrendt), pages 96 and 97.